(No Model.)
C. BIVORT & J. NADLER.
WHEEL TIRE.
No. 532,942.  Patented Jan. 22, 1895.
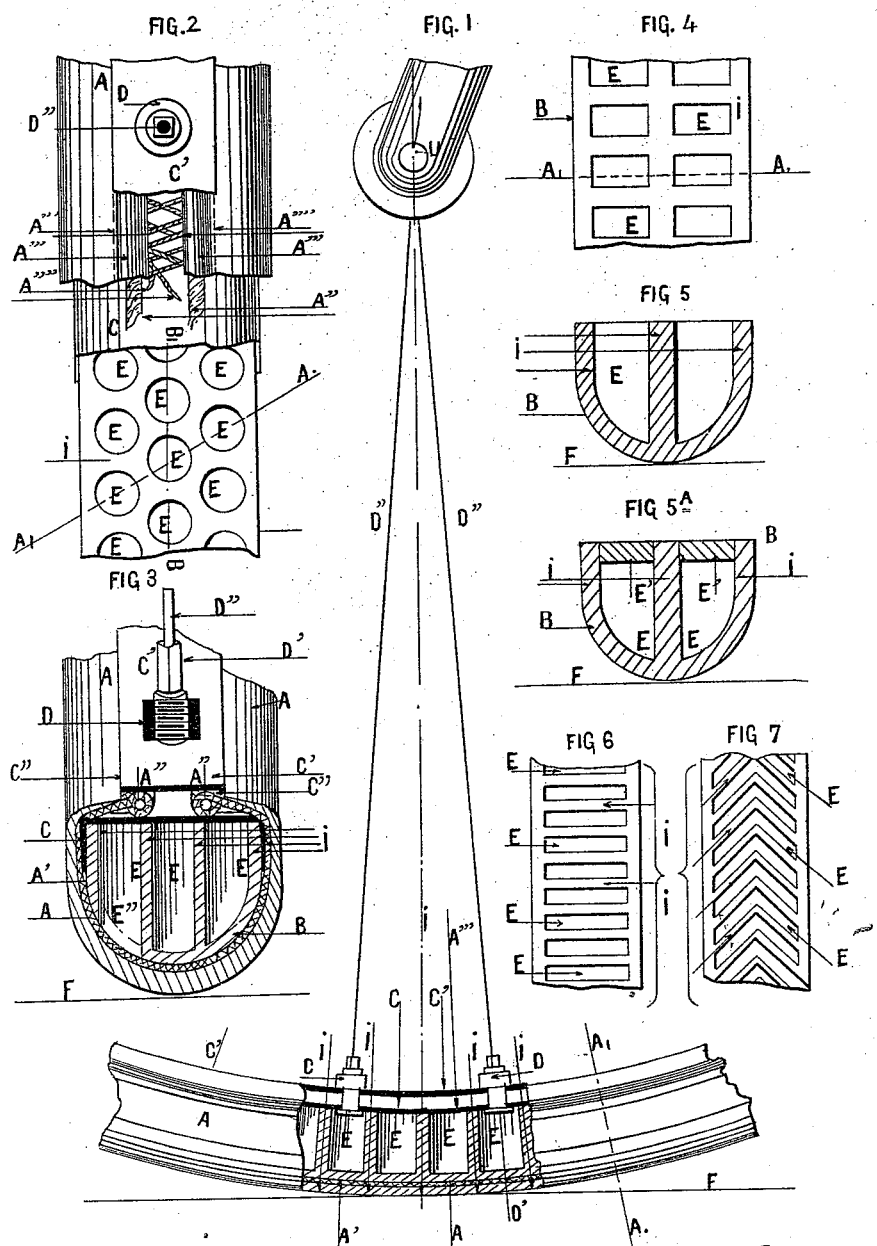
Witnesses
G. W. Rea,
Thos. A. Green
Inventors
Charles Bivort and
Jean Nadler,
By James L. Norris
Atty.

UNITED STATES PATENT OFFICE.

CHARLES BIVORT AND JEAN NADLER, OF PARIS, FRANCE.

WHEEL-TIRE.

SPECIFICATION forming part of Letters Patent No. 532,942, dated January 22, 1895.

Application filed May 14, 1894. Serial No. 511,244. (No model.)

*To all whom it may concern:*

Be it known that we, CHARLES BIVORT, a citizen of France, and a resident of Paris, and JEAN NADLER, a subject of the Emperor of Austria-Hungary, and a resident of Paris, in the Department of the Seine, France, have invented a new and useful Improvement in Wheel-Tires, of which the following is a specification.

This invention relates to improvements in rubber tires for cycle and other wheels, and is designed to provide an improved rubber tire formed by the combination of a special rubber core, crown, or inner tire, and of an outer casing or cover which serves both to protect this core or crown, when at work, and to secure it to the wheel rim.

The feature of this tire consists essentially in the special construction of the rubber core or crown, which is traversed by openings or cavities formed in the direction of the spokes, that is to say, the walls which separate these openings or cavities are arranged in a direction always normal to the wheel rim. These openings or cavities, which are formed in the core or crown during its manufacture, may be open at both ends, or only at one of their ends, or, in other words, they may traverse the core or crown from one side to the other, or may only form therein closed cavities, as will be described farther on. The shape and number of the said openings or cavities, as well as their arrangement, may be varied, while, however, retaining the normal position to the wheel rim.

In order that the invention may be readily understood, we will describe the same fully with reference to the accompanying drawings, in which—

Figure 1 shows a portion of the tire and of a cycle wheel to which it is applied. Fig. 2 is a view thereof in plan, with certain portions removed in order to show the various parts of the tire proper and of its mounting. Fig. 3 is a section taken in a radial direction. Figs. 4, 5, 5ª, 6 and 7 show other forms or shapes of openings or cavities in the elastic crown.

The following letters of reference indicate the principal parts in the drawings:

A is the outer casing or cover enveloping the elastic core or crown B. A' is a piece of canvas or other fabric interposed between the said casing and the crown, and which may be provided along its edges with a cord A''.

A''' represents a laced seam formed by small cords A''''.

C is the wheel rim, and C' a metallic hoop or ring having flanges C''. This hoop or ring engages the edges of the core or crown so as to prevent it, when at work, becoming enlarged or widened under the action of the load.

D are nuts for fixing the spokes D'', which have square parts D' for tightening them up.

E are the openings or cavities in the crown. E' are partitions closing the inner ends of the cavities E, and I are partitions separating the cavities.

F is the ground level, and U the center of the wheel.

A, A and B, B are the lines on which the sections are taken.

In Fig. 3, which shows two arrangements of openings or cavities, one of the openings in the core or crown, that to the left, is shown as completely traversing the said crown from its inner or upper surface to its outer or lower surface at E''. The other two openings form cells or cavities open only at one extremity; but it must be understood that in practice either one or the other arrangement may be adopted, but not the two at the same time, as this figure would appear to indicate.

As previously stated, the openings E may pass completely through the core or crown B, or may only form therein cavities open at the inner extremities. With the latter arrangement, which is more generally represented in the drawings, the rim C may be so formed as to close, or make a tight joint over, the openings of the cavities, as shown more clearly in Fig. 3, so that the air contained in each cavity, on being compressed, then also acts as an elastic agent.

Figs. 1, 2 and 3 show a core or crown with the openings or cavities E arranged in rows or series of three. The alignment of these rows may also be oblique (as shown by the line A, A in Fig. 2) or may be normal to the inner core or crown, as in the section shown in Fig. 3.

The outer casing or cover A, which envelops the so-called crown B, and which serves to secure it to the rim, may likewise be formed of rubber. It is provided interiorly with the canvas or other fabric A' which, as stated, may be connected to cords A" sewed to the two edges of the outer casing. These cords thus form beads or swellings adapted to engage in depressions formed in the rim for this purpose. This system of fixing, which may be modified in any suitable way, is only shown by way of example, as it is not upon this point that the invention bears.

Fig. 2 shows another and different mode of fixing. It will there be seen that the joining of the two edges of the outer casing or cover A is effected by means of a laced seam A''' which alone would suffice, without the help of the metallic ring C', to enable the outer casing to fulfill its purpose, that is to say, to unite the core or crown B to the rim when stretched around said crown.

The outer casing or cover A may be replaced when it is worn or damaged, and the core or crown B will outlast several outer casings or covers.

Having now described our invention, we wish it to be understood that we lay no claim to the accessory arrangements which it has been necessary to describe in order to show a method of securing the system of tire to the rim of a cycle wheel, but

What we do claim, and desire to secure by Letters Patent, is—

In a rubber tire for wheels, the combination of an elastic core or inner tire having radial openings or cavities whose greatest depth is in the direction of the spokes, a flanged metallic wheel rim embracing the inner edges of said inner tire, a textile lining arranged about said inner tire and wheel rim, an elastic outer casing or cover for protecting the same, a hoop having side flanges embracing the turned edges of the textile fabric and the edges of the elastic outer casing for clamping the same on the wheel rim, and fastening devices for clamping said hoop and rim together and for securing the spokes thereto, substantially as described.

In testimony whereof we have signed this specification in the presence of two subscribing witnesses.

CHARLES BIVORT.
JEAN NADLER.

Witnesses:
CLYDE SHROPSHIRE,
J. V. TORY.